United States Patent
Christensen et al.

(10) Patent No.: US 8,020,908 B2
(45) Date of Patent: Sep. 20, 2011

(54) APPARATUS FOR HANDLING LAYERS OF PALLETISED GOODS

(75) Inventors: Torben Christensen, Arden (DK); Henrik Kjeldgaard Hansen, Brønderslev (DK)

(73) Assignee: Univeyor A/S, Arden (DK)

( * ) Notice: Subject to any disclaimer, the term of this patent is extended or adjusted under 35 U.S.C. 154(b) by 261 days.

(21) Appl. No.: 12/310,247

(22) PCT Filed: Aug. 17, 2007

(86) PCT No.: PCT/DK2007/000376
§ 371 (c)(1),
(2), (4) Date: Feb. 18, 2009

(87) PCT Pub. No.: WO2008/019691
PCT Pub. Date: Feb. 21, 2008

(65) Prior Publication Data
US 2009/0324377 A1  Dec. 31, 2009

(30) Foreign Application Priority Data
Aug. 18, 2006  (DK) .................................. 2006 01075

(51) Int. Cl.
*B65G 47/91* (2006.01)
(52) U.S. Cl. ......................................... 294/64.1; 294/65
(58) Field of Classification Search ................. 294/64.1, 294/65, 2, 907; 414/627, 737; 901/40, 46, 901/47; 271/108
See application file for complete search history.

(56) References Cited

U.S. PATENT DOCUMENTS

| | | | |
|---|---|---|---|
| 3,229,953 A | 1/1966 | Muir, Jr. | |
| 3,307,818 A | 3/1967 | Cocito | |
| 3,387,718 A * | 6/1968 | Roth et al. | 294/64.1 |
| 3,406,938 A * | 10/1968 | Muir, Jr. | 294/65 |
| 3,523,707 A * | 8/1970 | Roth | 294/65 |
| 4,185,814 A * | 1/1980 | Buchmann et al. | 271/108 |
| 5,207,467 A * | 5/1993 | Smith | 294/64.1 |
| 5,297,830 A * | 3/1994 | Hoke | 294/65 |
| 5,813,713 A * | 9/1998 | Van Den Bergh | 294/65 |
| 6,517,050 B1 | 2/2003 | Pabst | |
| 6,802,688 B1 * | 10/2004 | Andersen et al. | 294/64.1 |

FOREIGN PATENT DOCUMENTS

| | | |
|---|---|---|
| WO | WO 90/11244 | 10/1990 |
| WO | WO 97/45355 | 12/1997 |
| WO | WO 00/64790 | 11/2000 |

* cited by examiner

*Primary Examiner* — Paul T Chin
(74) *Attorney, Agent, or Firm* — Antonelli, Terry, Stout & Kraus, LLP.

(57) ABSTRACT

An apparatus for handling layers of palletised goods, including a vertically displaceable lift head (2) with a mainly horizontal suction face which is substantially adjusted in size for a pallet, and which comprises downwardly open suction chambers (8) which via individual ball valves and an air distribution chamber are connected to a centrifugal blower (4), which is the vacuum source of the apparatus. The suction face moves downwards against the upper side of an upper layer of goods on a pallet. The ball valves are light, thin-walled spherical valve bodies (10) which are closed if the associated suction chamber (8) is not blocked downwardly by contacting the upper side of the goods on the uppermost pallet layer. The lift head (2) comprises a vertically adjustable skirt with inflatable squeezing pads for exerting an inwardly directed pressure on the outer sides of the goods of the upper pallet layer.

9 Claims, 11 Drawing Sheets

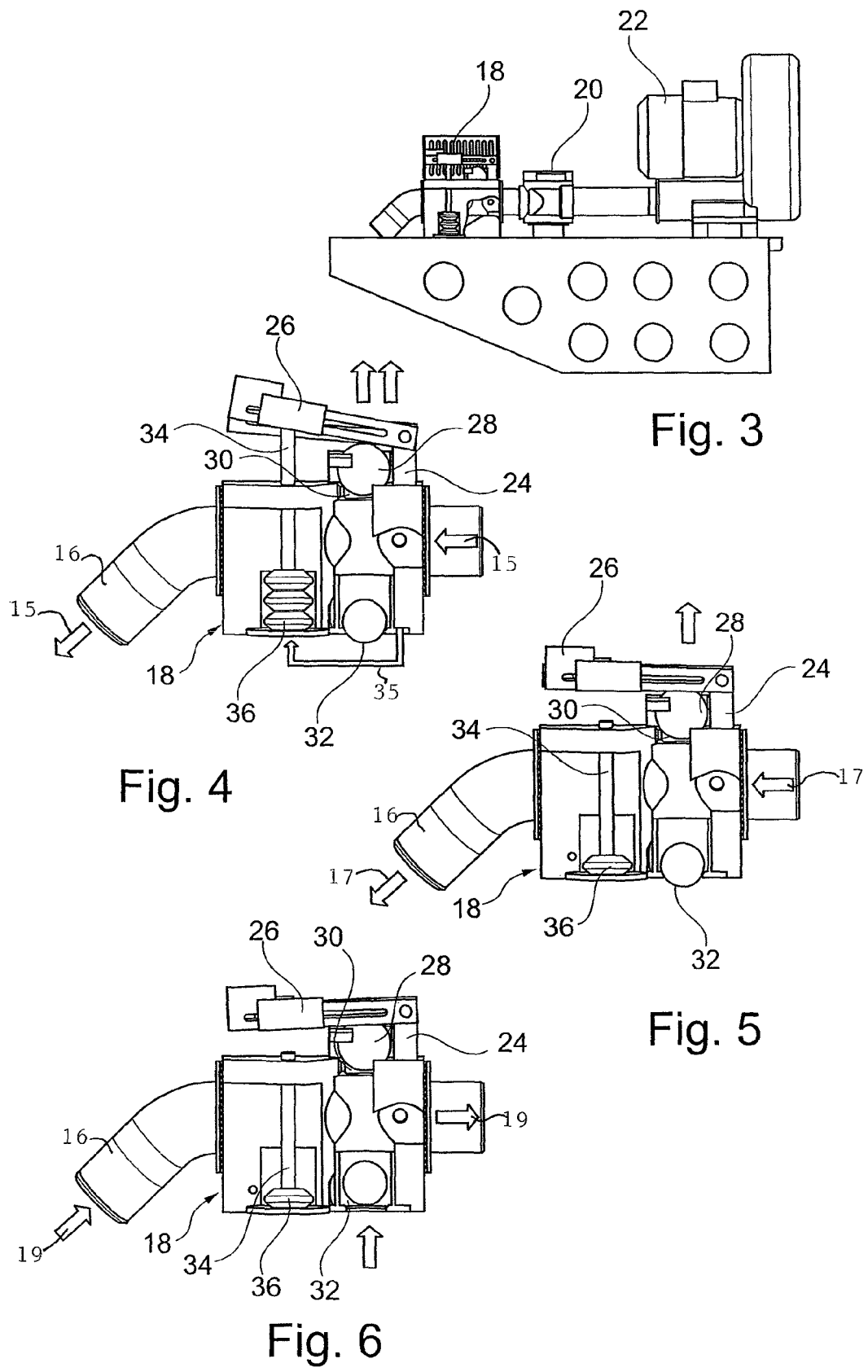

APPARATUS FOR HANDLING LAYERS OF PALLETISED GOODS

BACKGROUND OF THE INVENTION

1. Field of the Invention

The present invention concerns an apparatus for handling layers of palletized goods.

2. Description of the Prior Art

In order to make effective inexpesnive and simplified distribution of goods, most goods are sold on pallets, preferably the so-called EU pallets (800×1200 mm). A widespread need has appeared for also dispatching orders comprising lesser amounts of goods in a correspondingly effective way. Statistically it appears that many orders for small shops actually are consignments of goods which most often consist of very few layers or maybe just a single layer of palletized goods.

U.S. Pat. Nos. 3,406,938 and 3,229,953 describe a lifting device and an item holder using relatively complicated lifting or holding faces which have a large number of lesser chambers that are open toward the lifting face and the holding face, respectively. For lifting or holding of, by way of example, plate shaped items with different outer shapes or sizes in the printing industry, it is known to use lifting or holding faces with a differentiated vacuum chamber system, having a number of uniform, but individually connected chambers. These chambers by means of a valve system may be connected with one or more vacuum sources in such a way that sheets or plates with individual shape or size may be lifted or held fast with one and the same lifting or holding face.

WO-97/45355-A1 discloses an apparatus for lifting and moving of articles, comprising at least one arrangement with a cavity, hereafter called vacuum chamber, which is connected to an arrangement which is capable of producing negative pressure in the vacuum chamber. The underside of the lower plate is provided with an elastic airtight bottom and also is provided with a number of first through-passages to the vacuum chamber. With the invention each first passage is of a cylindrical design with a diameter reduction in the part which is connected to the vacuum chamber, forming a shoulder in the passage. The passage contains a body arranged moveably in the passage. In the body are planes which are at right angles to the center line of the passage which has a greatest diameter which is only slightly smaller than the diameter of the first passage. The first passage is provided with a second passage with a considerably smaller diameter than the first passage. The body is capable of essentially blocking the first passage when a negative pressure is obtained in the vacuum chamber with the exception of a given air flow in the second passage.

WO-00/64790-A1 and corresponding U.S. Pat. No. 6,802,688 discloses an apparatus for handling layers of palletized goods. The apparatus comprises a vertically displaceable lift head with a horizontal suction face which in size is adapted to a pallet and has a large number of downwardly opening suction chambers. The suction face is arranged to be moved downwards against the top side of an upper layer of individually or groupwise packed goods on a pallet. The suction chambers via individual valves are connected with a source of vacuum incorporated in the lift head, where the apparatus is intended for interacting with a depalletizing system. The valves between the suction chambers and the source of vacuum are designed as ball valves with very light thin-walled valve bodies that are enclosed in the suction chamber by means of lateral projections or by means of a retainer net, and which interact with upper round valve openings with spherical valve seats at the bottom if the actual suction chamber is not blocked at the bottom by contacting the top side of the goods in an upper pallet layer. Along the outer sides of the suction face, the lift head comprises means for exerting an inwardly pressure at the outer sides of the goods in the uppermost pallet layer. The description of the this invention is incorporated in the present application by reference.

SUMMARY OF THE INVENTION

The invention is a new and improved apparatus for handling layers of palletized goods, and which enables mechanising layerwise destacking of individual articles from a pallet with greater certainty, even if the individual pallet layers include openings between the articles or include articles that are film-covered in such a way that openings in the pallet layer are formed upwards so that the shut-off valves of the suction face are close to where there is a hole or openings in the pallet layer. openings are forced open when there is contact on the articles.

The apparatus according to the invention arresting means for actuating valve balls for individual suction chambers. The means are constituted by downwardly extending bluntly designed bodies which are resiliently suspended for yielding to valve balls which are already in closing abutment with the valve seat of the associated suction chamber, and for preventing valve balls from contacting the valve seats of valves that have not been closed. By means of these simple measures, there is hereby achieved a new and improved apparatus that enables handling of many different types of palletized goods in layers with great certainty.

Alternatively, the apparatus according to the invention the arresting means includes bodies bluntly designed at the bottom and which are arranged to be vertically displaceable in order to be displaced in height in relation to valve balls which are already in closing abutment with the valve seat of the associated suction chamber, and for preventing valve balls from contacting valve seats of valves that have not been closed.

In order to ensure automatic release of the valve balls, the apparatus according to the invention may advantageously be designed so that each of the valves includes a valve seat having an elastic material for releasing the valve balls automatically by venting a vacuum from the air distribution chamber.

With an object of achieving easier replacement of valve balls, the apparatus according to the invention may advantageously have the valve balls of each of the valves supported at the bottom on inwards projecting edge parts of elastic material.

In addition, the apparatus according to the invention includes a separate blower for operating inflatable squeezing pads. Between the blower and the inflatable squeezing pads is a changeover valve for connecting the inflatable squeezing pads either to the suction side or to the pressure side of the blower which is preferably is a side channel blower.

With regard to optimizing the functions of the apparatus according to the invention, the invention may advantageously be designed so that it includes a pressure regulating valve between the changeover valve and the inflatable squeezing pads.

In order to achieve an additionally simple and reliable action, the apparatus according to the invention may be designed so that the pressure regulating valve includes an upper venting valve with a valve ball which is actuated by one or more upper lever arms with regulating slides.

The apparatus according to the invention is suitably further designed so that the pressure regulating valve includes a cylinder or a bellows arrangement with a piston arranged to lift one or more of the lever arms for opening the venting valve.

BRIEF DESCRIPTION OF THE DRAWINGS

The invention is explained more closely in the following in connection with the drawing, on which:

FIG. 3 shows a side view of a separate side channel blower with a pressure regulating valve for operating the inflatable pads in an apparatus according to the invention;

FIG. 4 shows a side view, partly in section, of an embodiment of a pressure regulating valve for an apparatus according to the invention and shown with a setting corresponding to reduced pressure in the inflatable pads;

FIG. 5 shows a side view, partly in section, of an embodiment shown in FIG. 4 of a pressure regulating valve for an apparatus according to the invention and shown with a setting corresponding to high pressure in the inflatable pads;

FIG. 6 shows a side view, partly in section, of an embodiment shown in FIG. 4 of a pressure regulating valve for an apparatus according to the invention and shown with a setting corresponding to emptying the inflatable pads;

Like reference numerals identify like parts throughout the drawings.

DETAILED DESCRIPTION OF THE INVENTION

Figure 1:
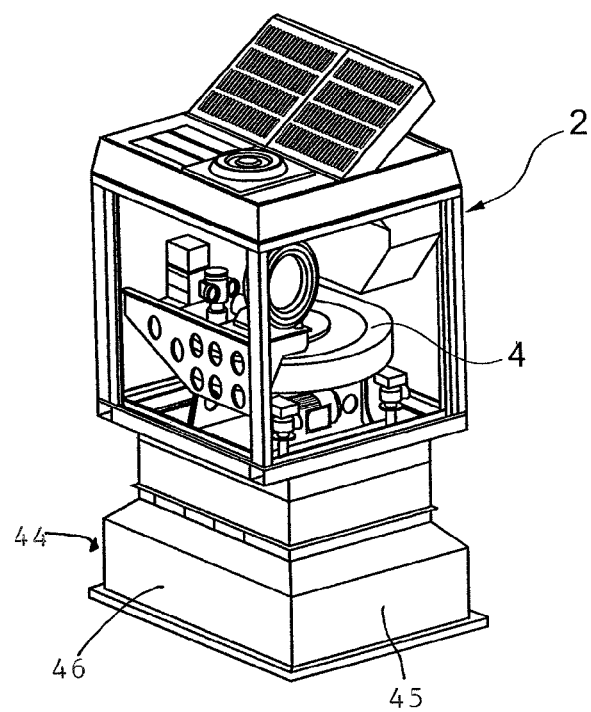
FIG. 1 shows a perspective view of an embodiment of a lift head for an apparatus according to the invention.
Figure 2:
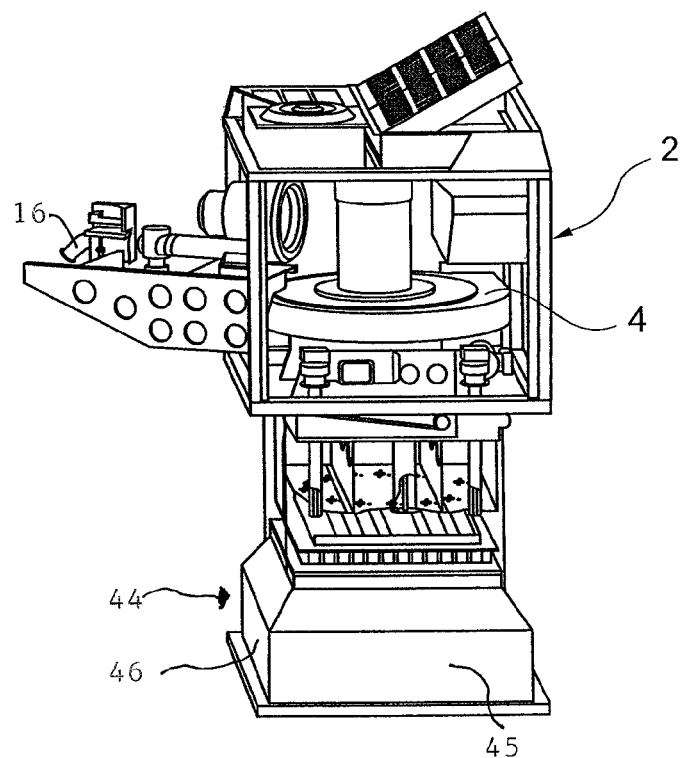
FIG. 2 shows a perspective view of the lift head shown in FIG. 1, seen from another angle and with a partly open side.

The lift head 2 shown in FIGS. 1-2 is adapted for destacking by layers of articles from a filled pallet that for example is taken from a rollerway. The lift head 2 includes a vacuum source in the form of a strong centrifugal blower 4, having a central suction opening connected to a rectangular air distribution chamber which via a special rotary valve 6 (FIGS. 22-25) is connected with a large number of suction chambers 8 (FIGS. 10 and 14-19) that are open at the bottom and together form a suction face.

The suction chambers 8 (FIG. 10 et. seq.) are connected at the top with the front of the rotary valve 6 (FIGS. 22-25) via round valve openings with spherical edges or valve seats at the bottom that fit to the outer spherical surface of rather light, thin-walled, spherical valve bodies 10 (FIG. 9, et. seq.) which are enclosed in each their suction chamber 8. Combined, the suction chambers 8 constitute a rectangular lower suction face 12 (FIGS. 9-13) which in size is adapted to a standard pallet, e.g. an EU pallet or a UK pallet.

Figure 7:
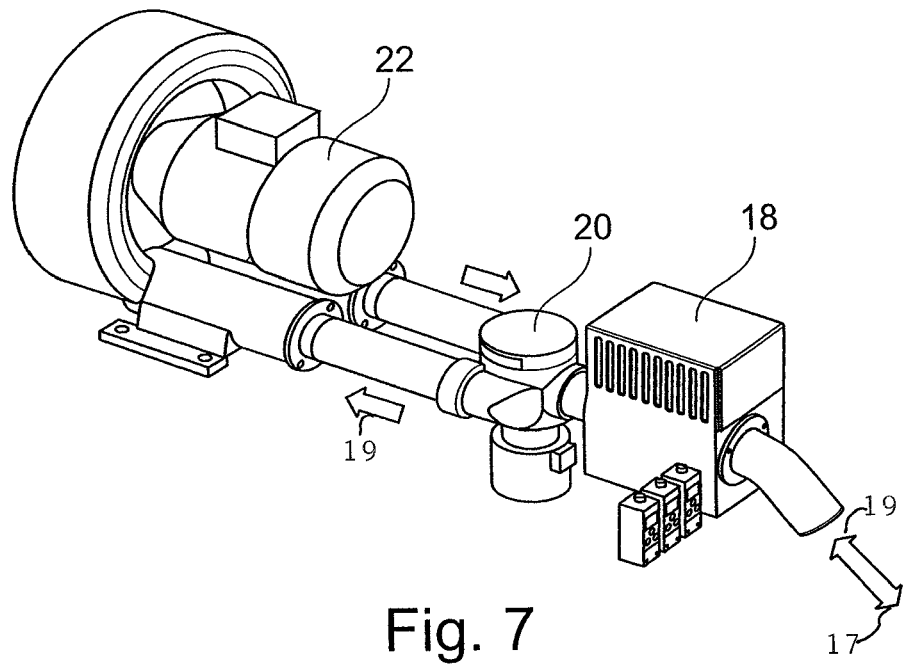
FIG. 7 shows a perspective view of an embodiment of a side channel blower with associated changeover valve and pressure regulating valve according to the invention for an apparatus according to the invention.

The lift head 2 includes, in accordance WO-00/64790 and corresponding U.S. Pat. No. 6,802,688, as mentioned in the introduction, a special vertically adjustable, outer squeezing arrangement 44 which at each of the outer sides of the suction face comprises inflatable pads 46. As shown in FIGS. 4, 5 and 7 of WO-00/64790 and corresponding U.S. Pat. No. 6,802, 680, the squeezing arrangement 44 therein is surrounded by an inner skirt 48 and an outer skirt or a casing 50 for absorbing the reaction pressure of the squeezing pads 46 therein such that when the pads are inflated, an inwardly directed squeezing pressure is exerted on the outer sides of the pallet layer. Vertical adjustment is provided by the squeezing arrangement 44 which provides adjustment of the squeezing arrangement in height relative to the actual goods in the pallet layer. Preferably a motor driven winch and lift slings is utilized at each side of the lift head 2.

The squeezing pads 46 of FIGS. 1 and 2 are generally identified by reference numeral 46 which correspond to WO-00/64790 and U.S. Pat. No. 6,802,680 and are inflated via a pressure regulation valve 18 and a changeover valve 20 by means of air from a side channel blower 22 (FIGS. 3-7) so that the pallet layer is clamped between the squeezing pads simultaneously with activating the suction face 12. When the squeezing pressure is to be relieved subsequently, this occurs rapidly by shifting the changeover valve 20 so that the side channel blower 22 provides for rapid emptying of the squeezing pads 46.

The pressure regulating valve 18 includes an upper pressure regulating system 24 with two lever arms 26 that actuate a valve ball 28 in a ball valve with a valve seat 30 with a permanent downwards pressure which can be set by means of slides on the lever arms 26, as the use of one of the lever arms 26 corresponds to low pressure in the squeezing pads. When high pressure is present in the squeezing pads 46 of FIGS. 1 and 2, both lever arms 26 are used.

FIG. 5 corresponds to high pressure in the tube stud 16 which is connected to the inflatable pads 46 of FIGS. 1 and 2 as indicated by arrows 17. The inflatable pads 46 are positioned inside a lower surrounding inner and outer skirt 45 of FIGS. 1 and 2 The ball valve with the valve seat 30 is then closed. When low pressure is present in the inflatable pads 46, the ball valve in FIG. 4 is open, as indicated by arrows 15. Opening the ball valve 32 with the valve seat 30 in FIG. 4 by upward movement of the lever arms 26 is effected by means of a piston 34 and a bellows arrangement 36, as a solenoid valve (not illustrated) is opened and feeds air to the bellows arrangement 36, as shown by the arrow 35.

In FIG. 6, the inflatable pads 46 inside the lower surrounding inner and outer skirt 45 of FIGS. 1 and 2 are emptied through the tube stud 16 as indicated by arrows 19. The ball valve with the valve seat 30 is closed while a lower ball valve 32 is open so that air is also sucked in from the surroundings. The object is preventing the side channel blower 22 from being blocked when the squeezing pads are without air.

If the actual pallet layer to be lifted by means of the lift head 2 is relatively light and fragile packing items that do not stand up to lateral pressure, and which do not require very great suction pressure either, the overall suction pressure may be lowered by reducing the rotational speed of the centrifugal blower 4. Whether the valve balls 10 are closing or not is only determined by the combination of actual opening in the pallet layer and the rotational speed of the centrifugal blower 4.

Figure 8:
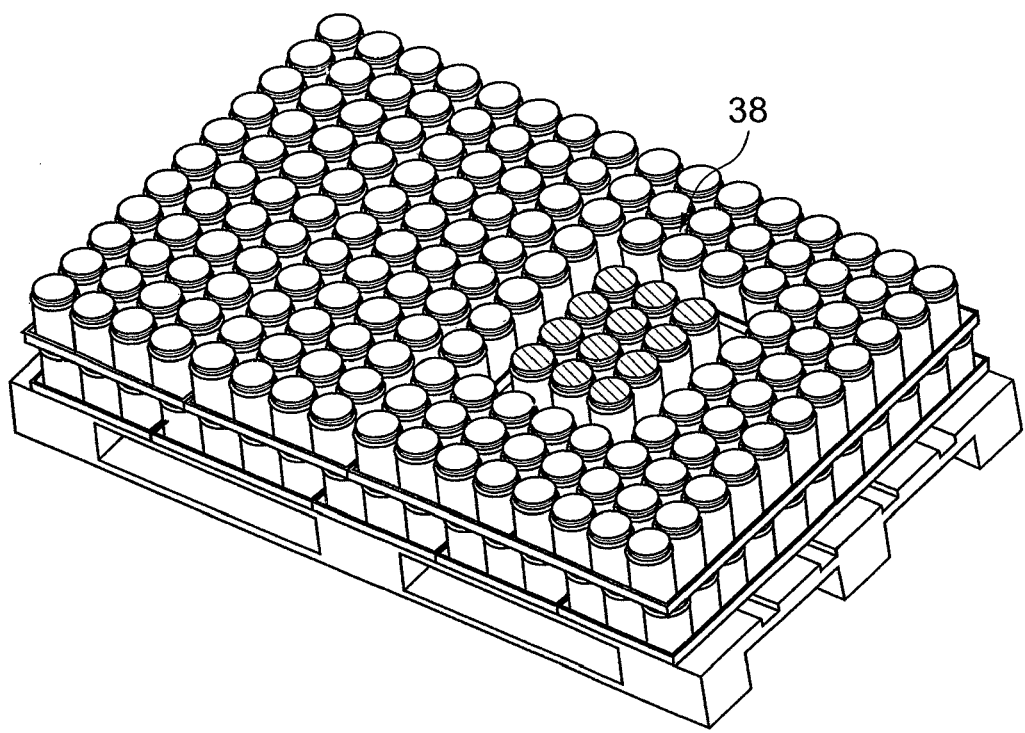
FIG. 8 shows a perspective view of a pallet layer for illustrating a pallet layer with holes in the pallet layer which will require forced opening of the suction chambers of the suction sole.

In FIG. 8 is shown a pallet with an uppermost pallet layer 38 in which there is a hole or opening which is larger than 300 cm$^2$. This implies that to achieve a secure and rapid depalletizing, it is necessary to apply forced action downwards on the valve balls 10 in order to avoid that the valve balls 10 close the associated suction chambers 8 due to false air in the pallet layer 38. The openings which are cross hatched are not blocked.

FIGS. 9-13 show an embodiment of an arresting system according to the invention, where a common frame 40 opposite each valve opening in the suction chambers 8 is provided with individually loose pins 42, which, however, can be locked in relation to the frame 40. The arrow 45 in FIGS. 9-11 indicates upward and downward vertical measurement of the common frame 40 which carries the pins 42.

Figure 9:
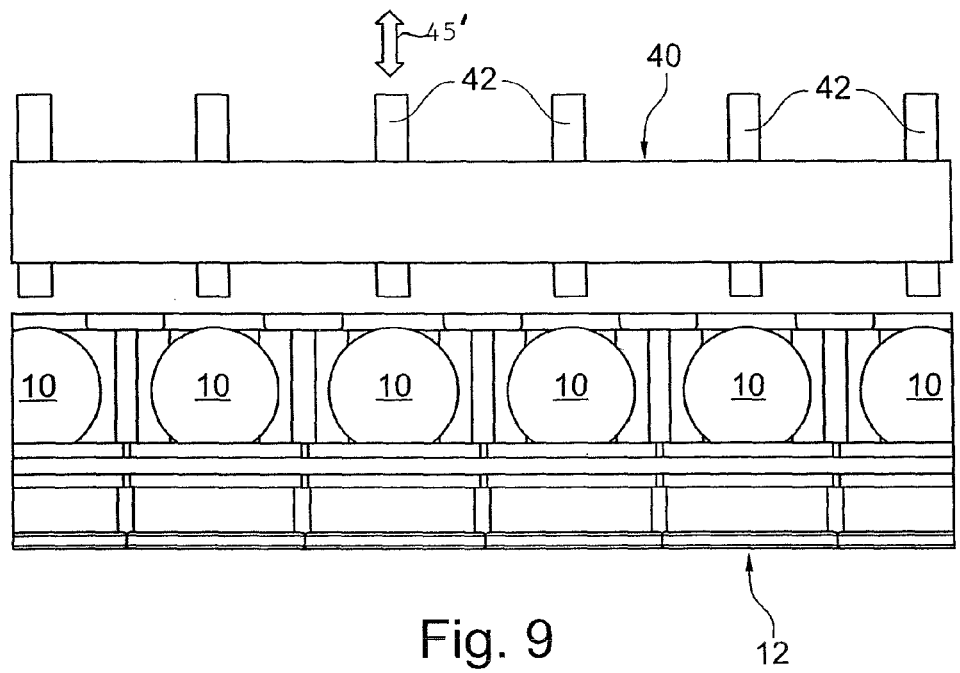
FIG. 9 shows a side view of an embodiment of arresting means for an apparatus according to the invention, shown in initial position.

In FIG. 9, the suction face 12 has been moved down upon a pallet layer 38 with openings so that the three left suction chambers 8 are placed upon an object that blocks the suction chambers 8 at the bottom, while the three right suction chambers 8 are not blocked at the bottom by an object or an article.

Figure 10:
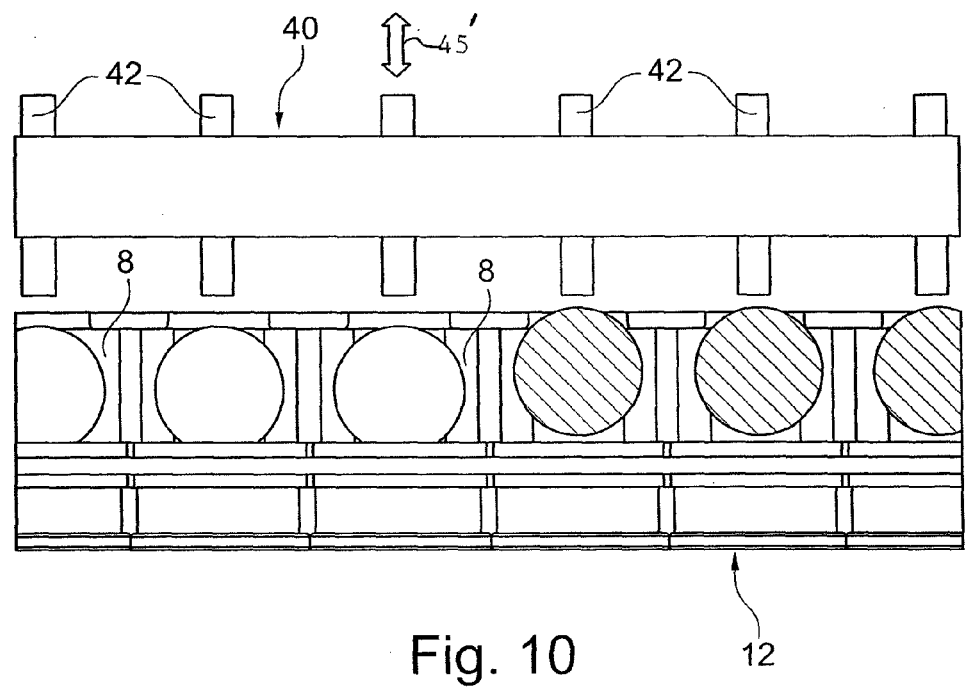
FIG. 10 shows a side view of arresting means, shown in FIG. 9, for an apparatus according to the invention, shown with activated vacuum.

In FIG. 10, the suction face 12 is also moved down upon the pallet layer 38 (FIG. 8) and vacuum is activated. The situation is changed, as the valve balls 10 to the right, which are cross hatched, are now closed. That is, the three left suction chambers 8 are communicating with the source of vacuum while the three right suction chambers 8 are now closed, because the suction face 12 is not in contact with objects or articles.

Figure 11:
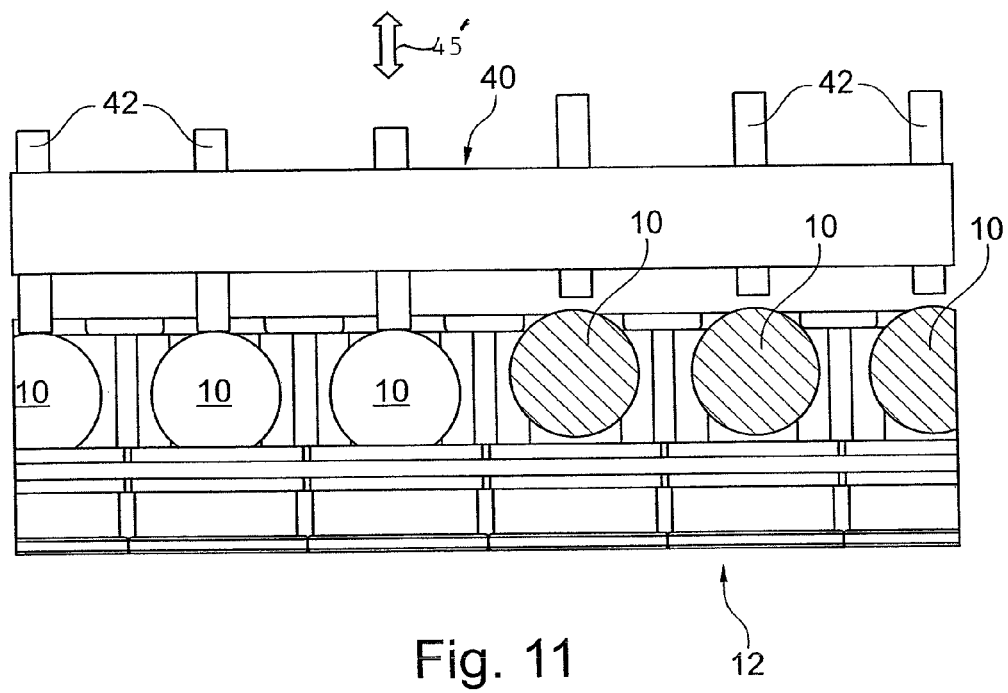
FIG. 11 shows a side view of arresting means, shown in FIG. 9, for an apparatus according to the invention, shown with activated vacuum and lowered frame.

In FIG. 11, the suction face is also moved down upon the pallet layer 38 (FIG. 38) and vacuum is activated. That is, the situation is unchanged, as the three left suction chambers 8, which are cross hatched, are communicating with the source of vacuum while the three right suction chambers 8 are still closed, because the suction face 12 is not in contact with objects or articles. The frame 40 is now moved down so that three pins 42 to the left are in contact with the valve balls 10 in the open suction chambers 8, while three pins 42 to the right are in contact with valve balls 10 in the blocked suction chambers 8. That is, the pins 42 to the left are farther down compared with the other three pins 42 to the right.

Figure 12:
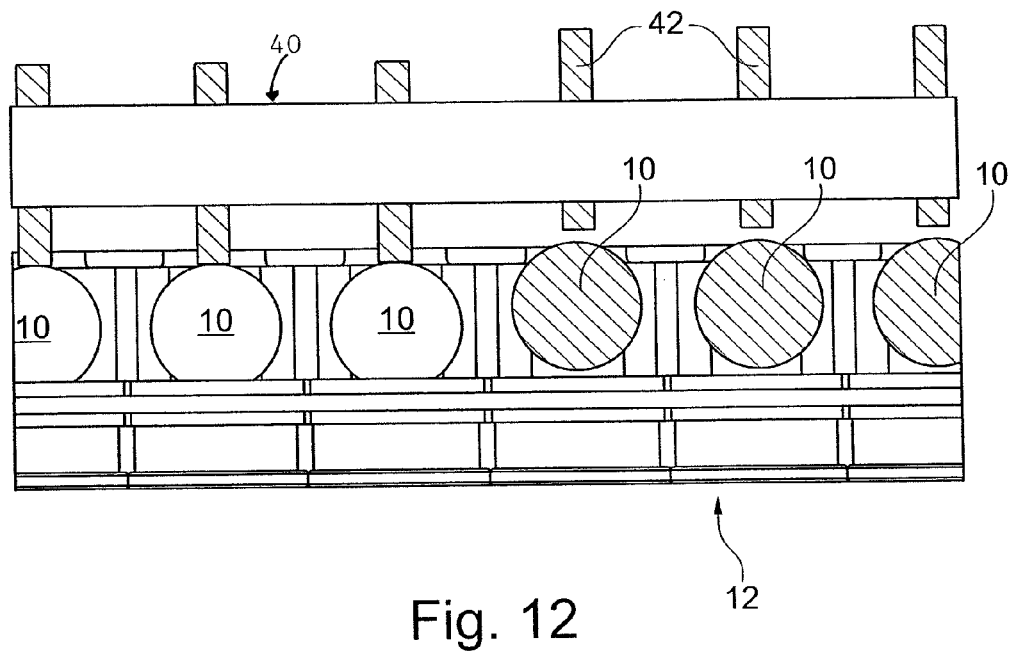
FIG. 12 shows a side view of arresting means, shown in FIG. 9, for an apparatus according to the invention, shown with activated vacuum, lowered frame and locked pins.

In FIG. 12, the situation is almost unchanged as the pins 42 are here locked in the frame 40 only.

Figure 13:
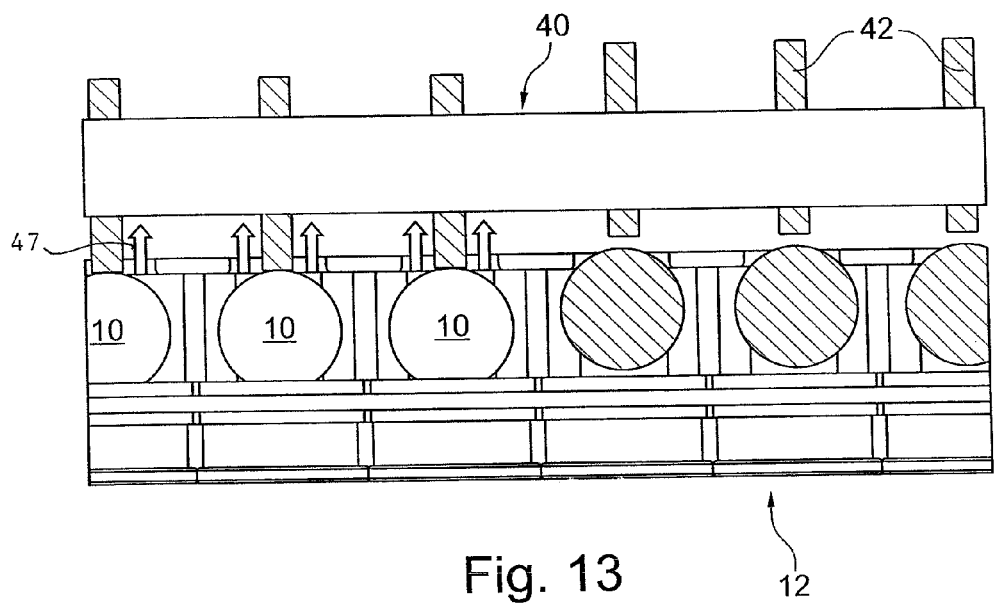
FIG. 13 shows a side view of arresting means, shown in FIG. 9, for an apparatus according to the invention, shown with activated vacuum, lowered frame and actively fixed pins.

In FIG. 13, the situation is still unchanged with vacuum being activated. Where the suction face previously had contact with an article or an object, by plucking a film-enveloped product, an airflow 47 occurs due to forced opening by means of the pins 42, where the airflow would normally make the valve balls close, but due to the forced opening in this area, the suction face will contact the article or the object anyway.

FIGS. 14-19 show a second embodiment of an arresting system according to the invention, where a common frame 44 opposite each valve opening in the suction chambers 8 is provided with individually rubber suspended arresting bodies 46.

Figure 14:
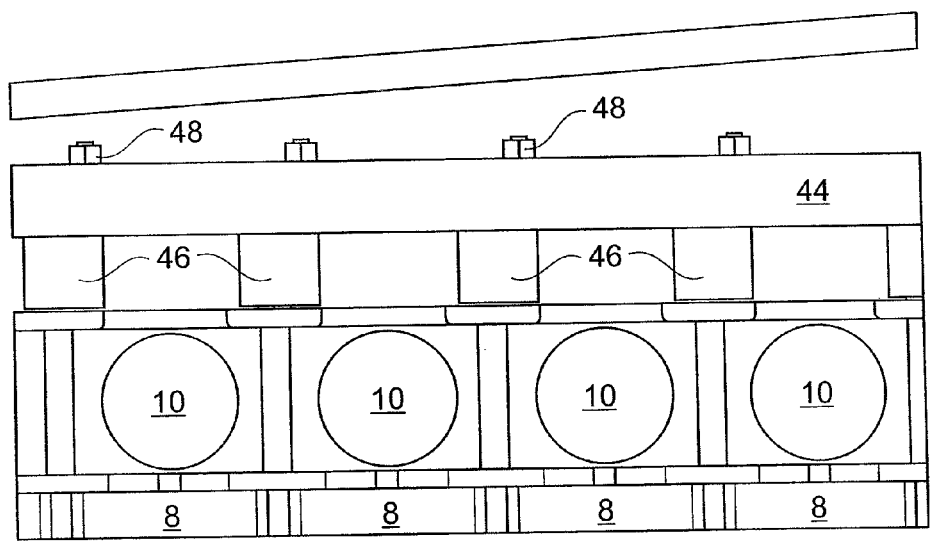
FIG. 14 shows a side view of a second embodiment of arresting means for an apparatus according to the invention, shown without activity.

In FIG. 14, the common frame 44 is in its initial position. No vacuum is activated.

Figure 15:
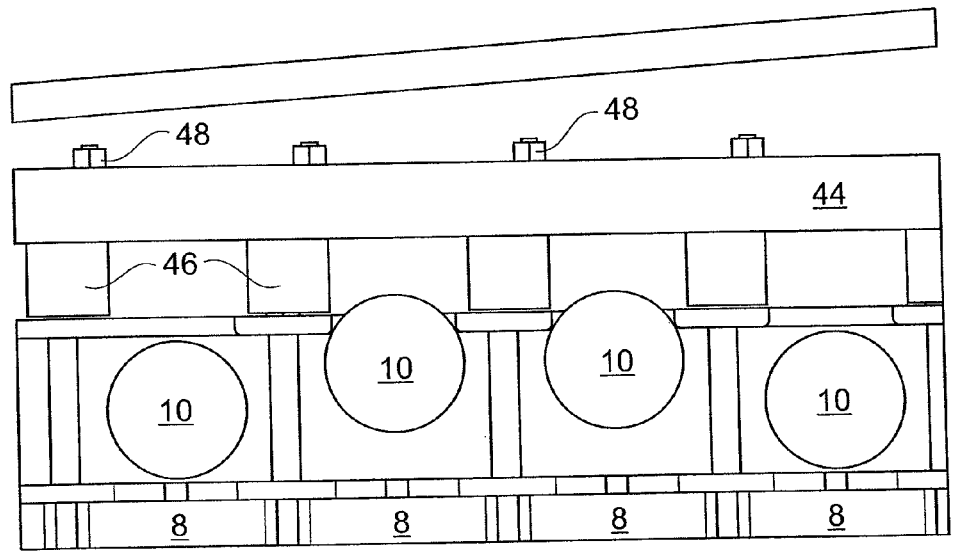
FIG. 15 shows a side view of arresting means, shown in FIG. 14, for an apparatus according to the invention, shown with activated vacuum.

Vacuum is active in FIG. 15. Valve balls 10 close where there is airflow, namely at the two middle suction chambers 8, while the outermost suction chambers are active because the suction chambers 8 are blocked at the bottom by abutting against article or object.

Figure 16:
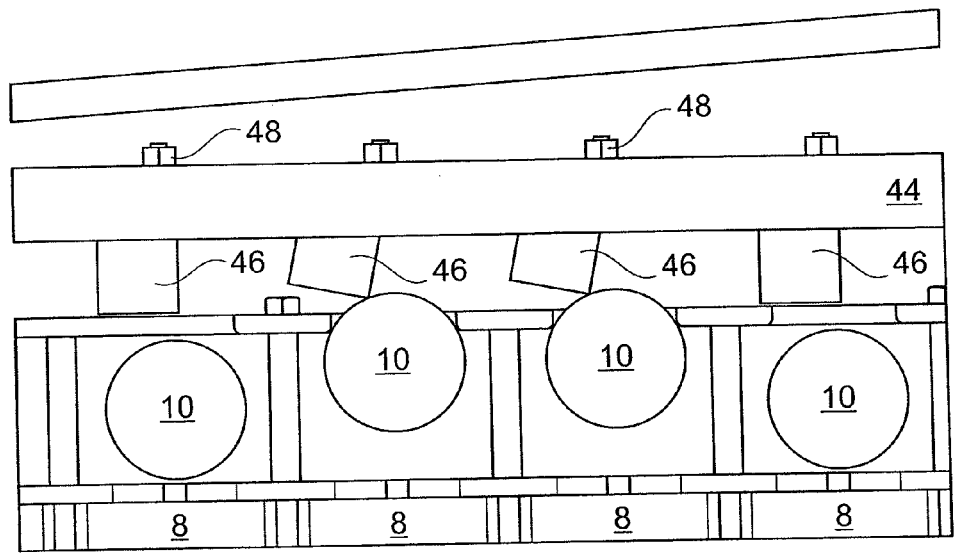
FIG. 16 shows a side view of arresting means, shown in FIG. 14, for an apparatus according to the invention, shown with activated vacuum and displaced arresting means that yield where valve balls close the valves.

In FIG. 16, vacuum is still active. Here the frame 44 is displaced to the right so that the two middle arresting bodies 46 hit the valve balls 10 and are deflected to the left, as the arresting bodies 46 are rubber suspended at 48.

Figure 17:
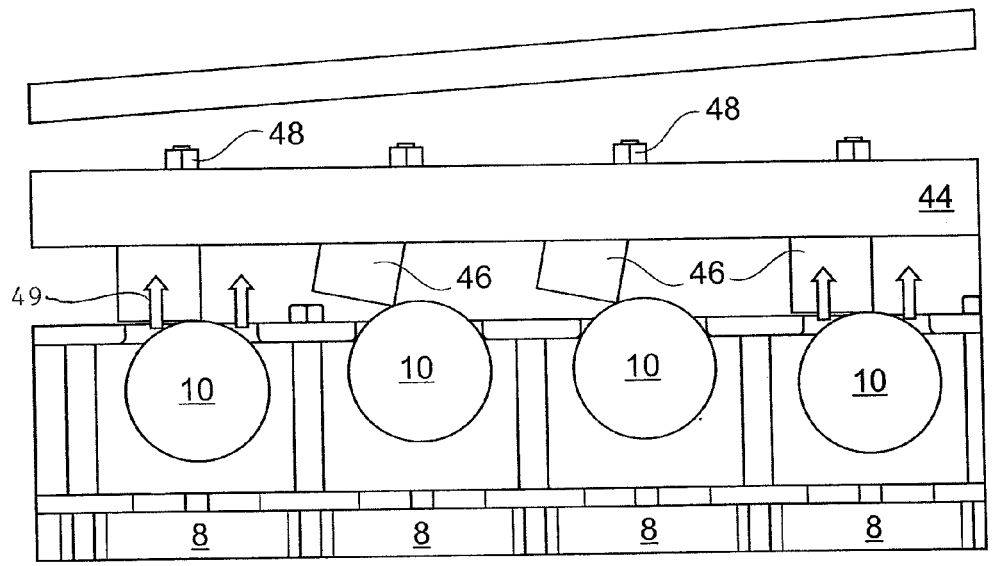
FIG. 17 shows a side view of arresting means, shown in FIG. 14, for an apparatus according to the invention, shown with activated vacuum and with forced opening of valve balls.

Vacuum is active in FIG. 17. While the suction face previously had contacted the product, now by plucking a film enveloped product, there will arise a certain airflow 49 which normally would make the valve balls close, but due to the partitioned suction face there is now achieved a forced opening of the area of the suction face previously having contact with the product.

Figure 18:
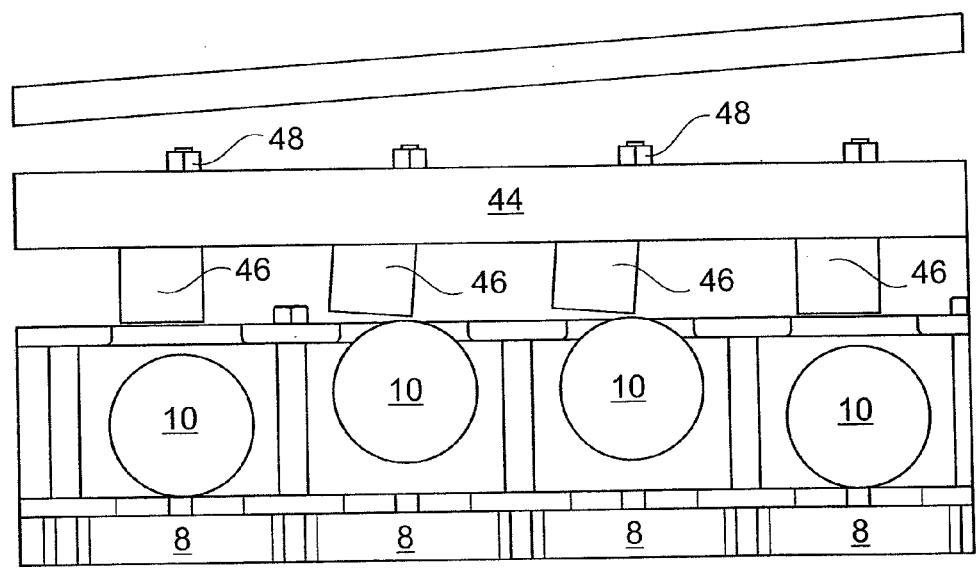
FIG. 18 shows a side view of arresting means, shown in FIG. 14, for an apparatus according to the invention, shown without vacuum and release of possibly stuck valve balls.
Figure 19:
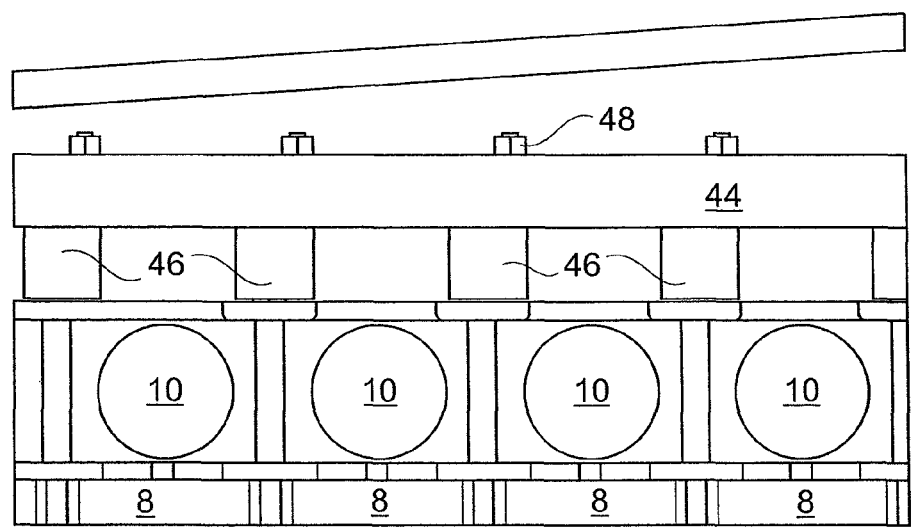
FIG. 19 shows a side view of arresting means, shown in FIG. 14, for an apparatus according to the invention, shown in initial position.

FIG. 18 shows how the frame 44, after finished plucking, is advanced further and presses possible stuck valve balls 10 free of the valve seat. In FIG. 19, the ball valves are again back to their initial position.

Figure 20:
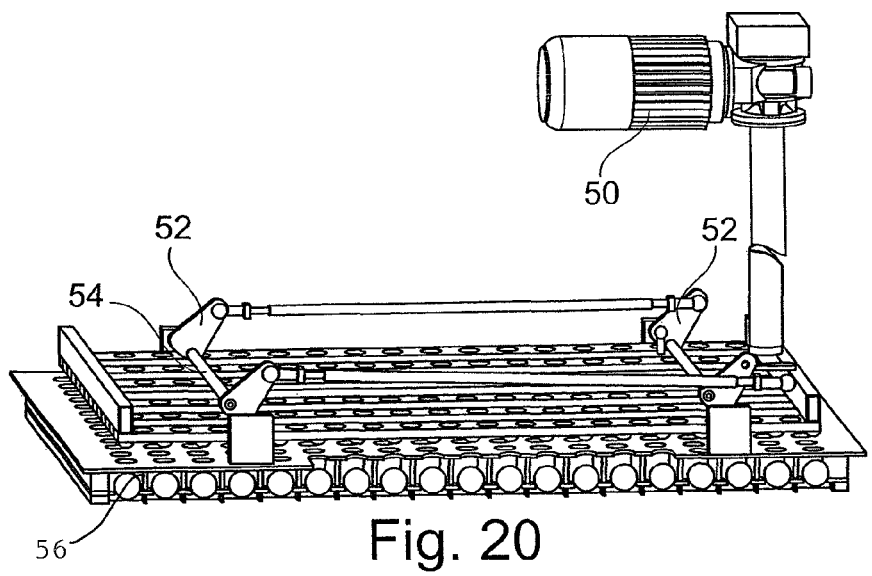
FIG. 20 shows a partial perspective view of an embodiment for a common activation system for arresting means, shown in inactive position.
Figure 21:
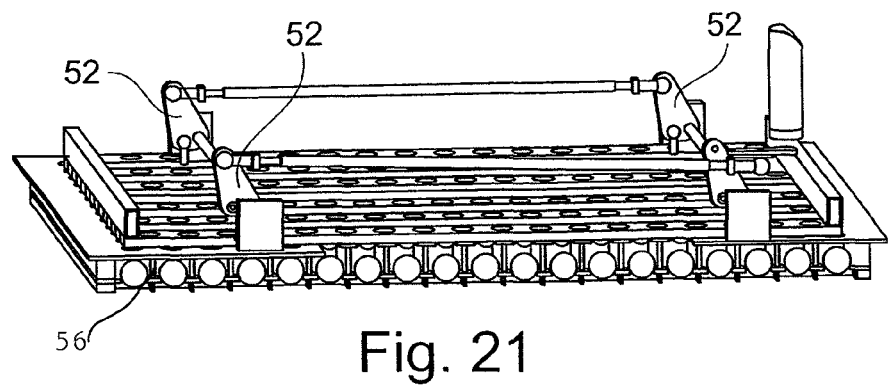
FIG. 21 shows a partial perspective view, of the embodiment shown in FIG. 20, of a common activation system for arresting means, shown in active position.

FIGS. 20-21 show how a common arresting system for the entire suction face can be operated by an electric gear motor 50, which via a number of eccentric discs 52 and turning arms 54, may lift and lower a large number of arresting bodies 56 opposite each suction chamber 8. In FIG. 20, the arresting bodies 56 are lifted off the suction chambers 8, while the arresting bodies 56 in FIG. 21, are lowered into each their valve opening.

Figure 22:
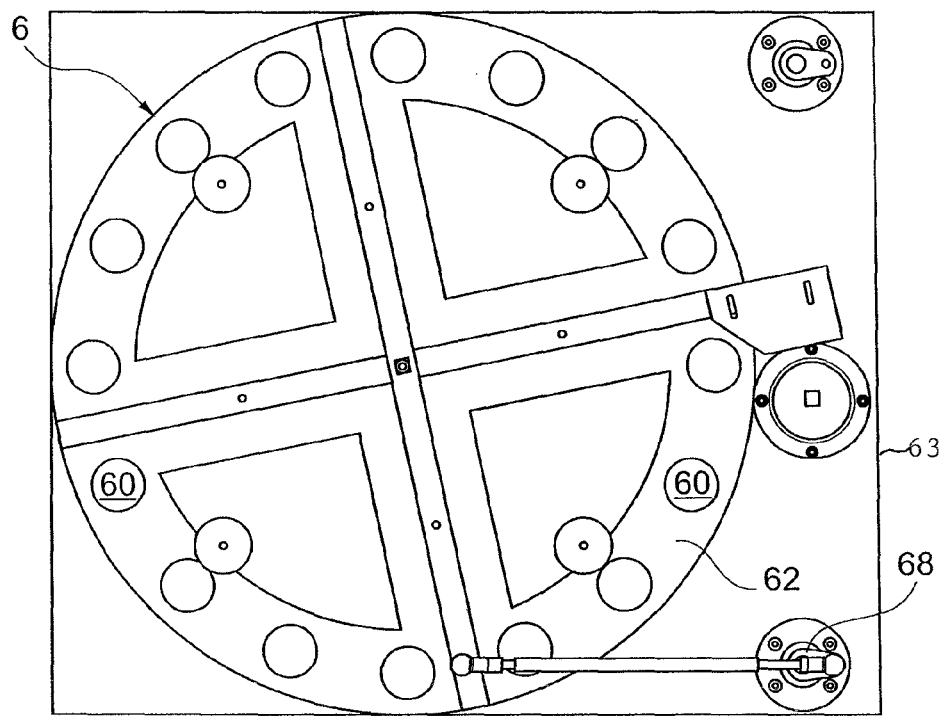
FIG. 22 shows a plan view of an embodiment for a common rotary valve between suction face and air distribution chamber by an apparatus according to the invention, shown in open position.
Figure 23:
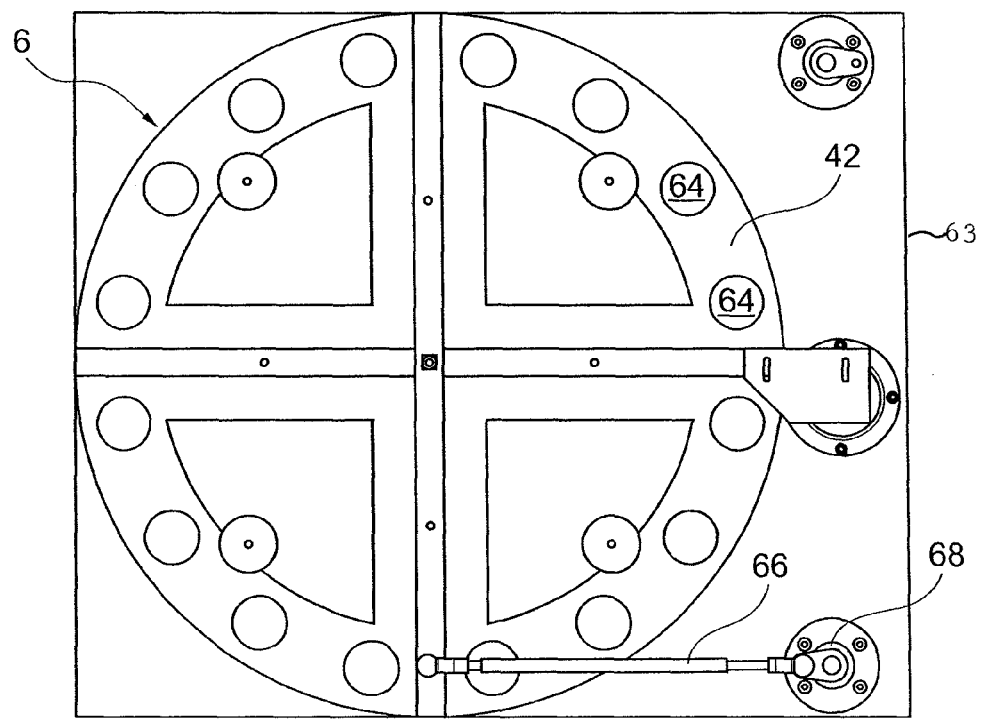
FIG. 23 shows a plan view of an embodiment shown in FIG. 22, of a common rotary valve between suction face and air distribution chamber in an apparatus according to the invention, shown in closed position.

The above-mentioned rotary valve 6, which is shown in FIGS. 22-23, has a circle of mutually separate valve openings 60 which are formed in the lower wall of the air distribution chamber 63, and a valve plate 62 arranged rotatably in relation thereto with a corresponding circle of valve openings 64. The valve plate 62 is arranged to be turned for opening and closing the rotary valve 6 by means of arms 66, an eccentric 68 and an electric motor.

Figure 24:
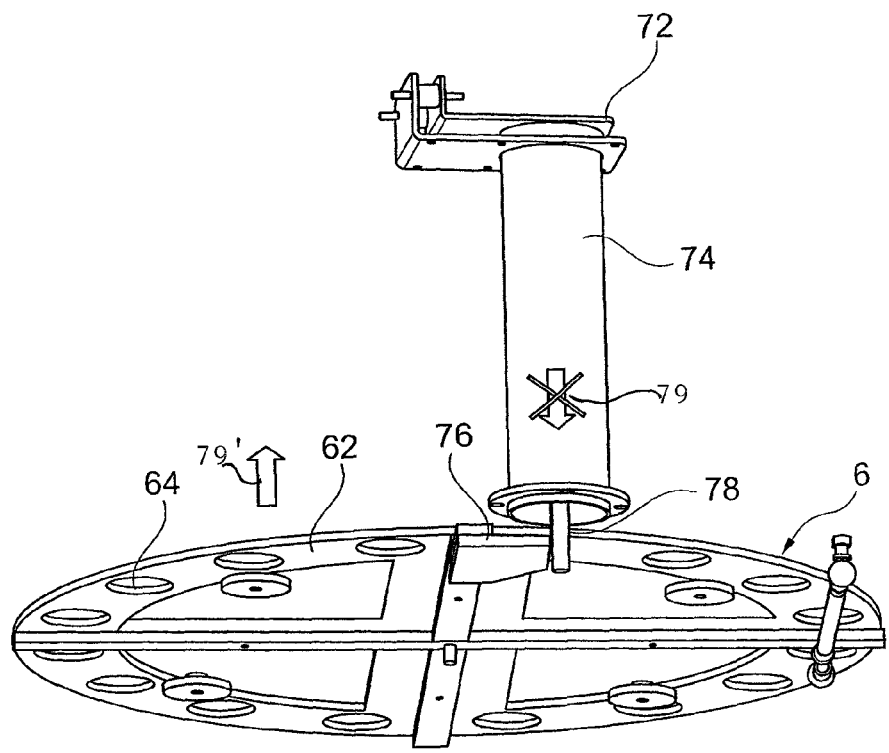
FIG. 24 shows a perspective view of a common rotary valve shown in FIG. 22, combined with an embodiment of a vacuum venting system, shown with open rotary valve and closed vacuum venting connection, respectively.
Figure 25:
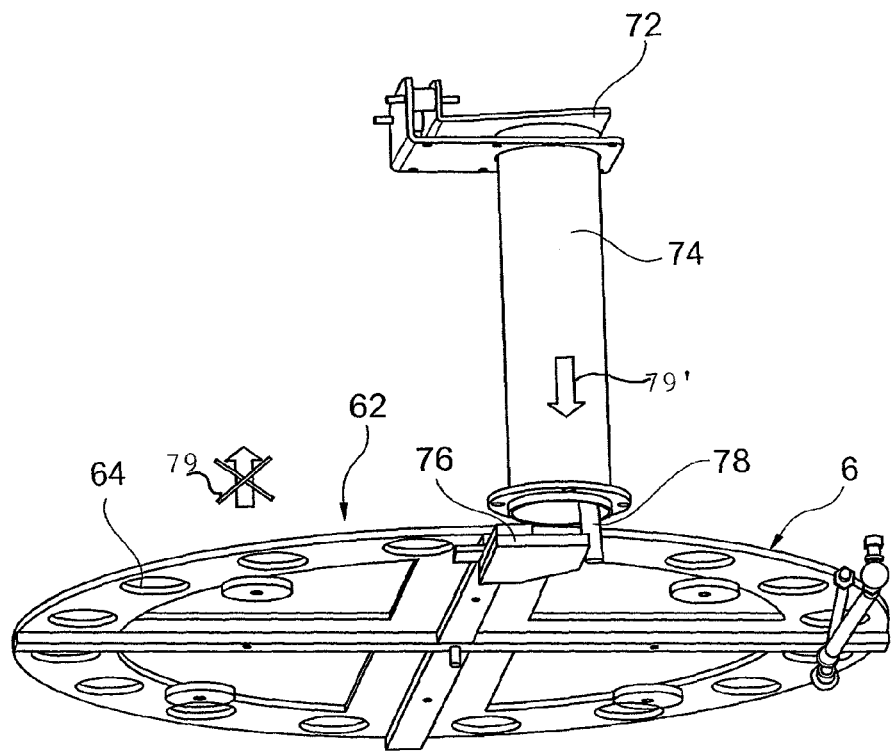
FIG. 25 shows a perspective view of a common rotary valve shown in FIG. 23, combined with an embodiment of a vacuum venting system, shown with closed rotary valve and open vacuum venting connection, respectively.

FIGS. 24 and 25 additionally show that the rotary valve 6 interacts with a vacuum valve 72, which is disposed in open air and spaced apart from the rotary valve 6, namely at the end of a vertical pipe 74. However, vacuum valve 72 interacts with the rotary valve 6 via an actuation plate 76 and an actuation rod 78 which is connected with the vacuum valve 72. FIG. 24 shows the rotary valve 6 in open condition and the vacuum valve 72 in closed condition, while FIG. 25 shows the rotary valve 6 in closed condition and the vacuum valve 72 in the open condition. In FIG. 24, the arrow 79 with an "X" indicates that vacuum is not applied. In FIG. 25, the arrow 79' indicates the application of a vacuum.

Alternatively, the arresting means may be comprised of a common plate or frame on which opposite the individual valve seats for the suction chambers 8 there are mounted on individually resilient fingers. The fingers by means of the common plate or frame may be displaced across the valve openings in such a way that the resilient fingers, where the valve balls 10 are already in contact with the valve seat and shut off the suction chambers 8. The suction chambers yield to the valve balls 10 and move down along the top side of the valve balls 10 without pressing the latter downwards. The resilient fingers where the valve balls 10 are not in contact against the valve seat are moved in under the opposite side of the valve seat and prevent the valve balls 10 from subsequently shutting off the suction chambers 8. The advantage of this alternative arrangement is that there may be attained greater distance between the valve balls 10 and their associated valve seats. That is there may be attained greater airflow by arrested valve balls 10.

Finally, the suction face 12 may advantageously be built up from individual suction chambers of flexible material such as for example in the form of loose suction chambers 8 moulded in plastic. Thereby, a significant reduction in maintenance costs may be achieved. If the suction chambers 8 are made of flexible material with lower inwardly projecting retainer members for the valve balls 10, it will be much easier to replace damaged valve balls with new valve balls. New balls may just be pressed up into the suction chamber from below through the inwardly projecting flexible retainer members of the valve balls 10.

The invention claimed is:

1. An apparatus for handling layers of palletized goods, comprising a vertically displaceable lift head with a mainly horizontal suction face formed for a pallet, including downwardly opening suction chambers, individual ball valves and an air distribution chamber connected to a vacuum source, the suction face being movable downwards against an upper side of an upper layer of individual or a group packed goods on a pallet, the ball valves including walled spherical valve bodies, the ball valves being closed when an associated suction chamber is not blocked downwardly by contacting an upper side of the goods on an uppermost pallet layer, the lift head along outer sides of the horizontal suction face comprising a vertically adjustable skirt with inflatable squeezing pads for exerting an inwardly directed pressure on outer sides of goods of the upper pallet layer, each of the ball valves including means for preventing the valve balls from shutting off the valves, the affecting means actuating valve balls for individual suction chambers and comprising downwardly extending bodies which are resiliently suspended for yielding to valve balls which are already in closing abutment with a valve seat of an associated suction chamber for preventing valve balls from contacting the valve seats of valves that have not been closed.

2. An apparatus according to claim 1 wherein the means comprises downwardly projecting bodies which are vertically displaceable in height in relation to valve balls which are already in closing abutment with the valve seat of an associated suction chamber for preventing valve balls from contacting the valve seats of valves that have not been closed.

3. An apparatus according to claim 1, wherein each of the valves includes a valve seat comprising an elastic material for releasing the valve balls automatically by venting a vacuum from the air distribution chamber.

4. An apparatus according to claim 1, wherein the valve balls of each of the valves are supported at the bottom on inwardly projecting edge parts comprising elastic material.

5. An apparatus according to claim 4, comprising a blower for operating the inflatable squeezing pads, and a changeover valve located between the blower and the inflatable squeezing pads for connecting the inflatable squeezing pads either to a suction side or to a pressure side of the blower.

6. An apparatus according to claim 5 wherein the blower comprises a side channel blower.

7. An apparatus according to claim 4, comprising a pressure regulation valve between the changeover valve and the inflatable squeezing pads.

8. An apparatus according to claim 7, wherein the pressure regulating valve includes an upper venting valve with a valve ball which is actuated by at least one upper lever arm with regulating slides.

9. An apparatus according to claim 7, wherein the pressure regulating valve includes a cylinder or a bellows with a piston for lifting at least one of the lever arms for opening the venting valve.

* * * * *